(12) United States Patent
Giovannitti et al.

(10) Patent No.: US 11,602,838 B2
(45) Date of Patent: Mar. 14, 2023

(54) PROCESS AND SYSTEM FOR MONITORING BACKLASH IN A GEAR OF A JOINT OF AN INDUSTRIAL ROBOT

(71) Applicant: Comau S.p.A., Grugliasco (IT)

(72) Inventors: Eliana Giovannitti, Grugliasco (IT); Nicola Campagna, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 455 days.

(21) Appl. No.: 16/924,419

(22) Filed: Jul. 9, 2020

(65) Prior Publication Data
US 2021/0008712 A1 Jan. 14, 2021

(30) Foreign Application Priority Data

Jul. 10, 2019 (IT) .......................... 102019000011334

(51) Int. Cl.
| | | |
|---|---|---|
| *B25J 9/10* | (2006.01) | |
| *B25J 9/16* | (2006.01) | |
| *B25J 9/12* | (2006.01) | |
| *B25J 13/08* | (2006.01) | |

(52) U.S. Cl.
CPC ............. *B25J 9/103* (2013.01); *B25J 9/1633* (2013.01); *B25J 9/126* (2013.01); *B25J 13/085* (2013.01); *G05B 2219/41032* (2013.01)

(58) Field of Classification Search
CPC ................. B25J 9/103; B25J 9/1633; G05B 2219/41032
See application file for complete search history.

(56) References Cited

U.S. PATENT DOCUMENTS

| | | | | |
|---|---|---|---|---|
| 6,865,499 B2 * | 3/2005 | Yutkowitz | ............ | G05B 19/404 |
| | | | | 318/632 |
| 2005/0278148 A1 | 12/2005 | Bader et al. | | |
| 2008/0255772 A1 | 10/2008 | Sjostrand et al. | | |
| 2017/0105702 A1 * | 4/2017 | Naka | ...................... | A61B 8/483 |

FOREIGN PATENT DOCUMENTS

| | | |
|---|---|---|
| EP | 1932629 A1 | 6/2008 |
| EP | 1967333 A1 | 9/2008 |
| EP | 2759382 A2 | 7/2014 |
| WO | 2013050314 A1 | 4/2013 |

* cited by examiner

*Primary Examiner* — Kawing Chan
(74) *Attorney, Agent, or Firm* — Young Basile Hanlon & MacFarlane, P.C.

(57) ABSTRACT

A process for monitoring backlash in a gear of a joint of an industrial robot, wherein said joint includes a first joint body and a second joint body coupled together with the possibility of moving with respect to one other, a motor provided with an encoder, and a motion-transmission assembly designed to transmit the torque generated by said motor to said second joint body to bring about a movement of said second joint body with respect to said first joint body, said transmission assembly comprising said gear. The process is characterized in that the signal of the encoder of the motor for driving the joint is used without providing any additional sensor specifically dedicated to monitoring of the backlash.

14 Claims, 3 Drawing Sheets

PROCESS AND SYSTEM FOR MONITORING BACKLASH IN A GEAR OF A JOINT OF AN INDUSTRIAL ROBOT

CROSS-REFERENCE TO RELATED APPLICATIONS

This application claims priority benefit to Italian patent application number 102019000011334 filed Jul. 10, 2019 the entire contents of which is incorporated by reference.

TECHNICAL FIELD

The present invention relates to a solution for monitoring backlash of the gear of a joint of an industrial robot.

BACKGROUND

As is known, the backlash is the angular play between the teeth of two toothed wheels in mutual engagement; i.e., in other words, it is the distance by which the gap between the teeth of a first toothed wheel exceeds the thickness of the teeth of the second toothed wheel.

In general, a minimal amount of backlash is commonly provided in the gear to ensure smooth movements. However, this amount of backlash tends to increase in the course of use of the gear on account of the wear of the sides of the teeth caused by the repeated impact and sliding to which they are subjected.

Above a given limit, the backlash can cause a degradation of performance and may possibly also lead to jamming and failure.

With reference now to the field of industrial robots, solutions have already been proposed for monitoring backlash in the gears of robot joints, which envisage installation on board the robot of sensors purposely provided for measuring directly the effects of the backlash, and hence its degree, during movement of the joint, for example for measuring the deviation between the actual position of the moving body of the joint and the theoretical position envisaged by the control unit of the robot.

SUMMARY

In this context, the present invention proposes a solution for monitoring backlash that presents improvements over the known solutions referred to above, not envisaging additional sensors to be installed on board the robot.

The solution described herein hence envisages a simpler apparatus, and can be readily applied also on already installed and operative industrial robots.

In particular, the present invention regards a monitoring process according to claim 1 and a monitoring system according to claim 8.

The annexed claims form an integral part of the technical teaching provided herein.

BRIEF DESCRIPTION OF THE DRAWINGS

Further characteristics and advantages of the invention will emerge clearly from the ensuing description with reference to the annexed drawings, which are provided purely by way of non-limiting example, and in which.

DETAILED DESCRIPTION

In the ensuing description, various specific details are illustrated aimed at providing an in-depth understanding of the embodiments. The embodiments may be provided without one or more of the specific details, or with other methods, components, materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

Figure 1:
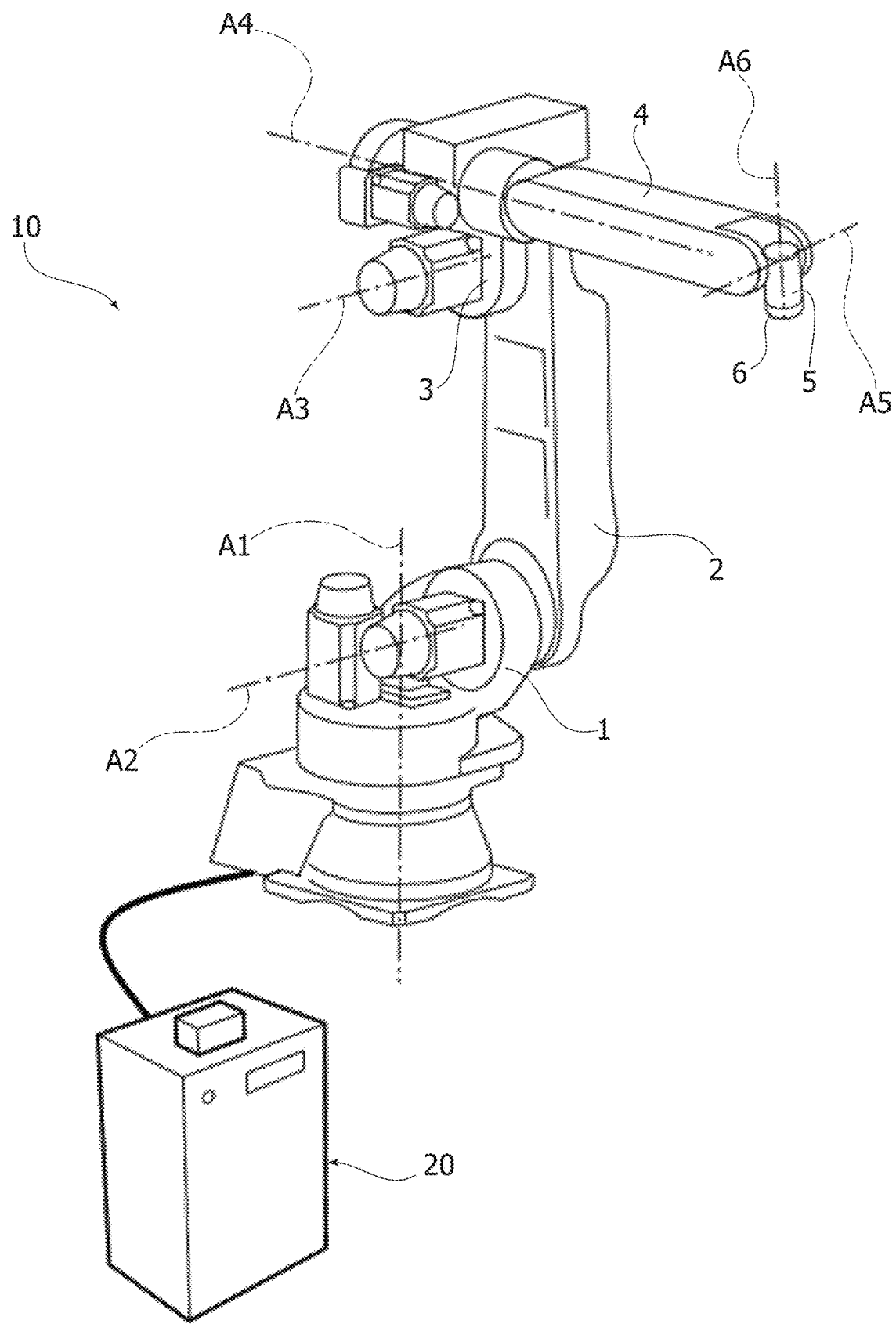
FIG. 1 is a schematic illustration of an example of system for monitoring backlash according to the solution described herein.

By way of example, FIG. 1 illustrates an industrial robot constituted by an articulated robot arm 10 with six axes of rotation A1-A6.

In particular, the robot arm 10 comprises a series of bodies 1-6 coupled together, where each body of the series subsequent to another body is rotatably mounted on the latter so that it can turn about the aforesaid axes. Each pair of the bodies 1-6 constitutes a joint of the arm 10.

The robot illustrated in the figures has rotary joints, but it should be noted that the solution described herein can be adopted also for monitoring translating joints, such as the joints of a cartesian robot.

Once again with reference to FIG. 1, a control unit 20 is connected to the robot arm 10 for driving the corresponding motors that drive the joints of the robot. Via the co-ordinated control of the various joints, the tool center point (TCP) of the robot, positioned on the last body 6, can be displaced along a pre-defined path and according to pre-defined orientations for each point of the path.

Figure 2:
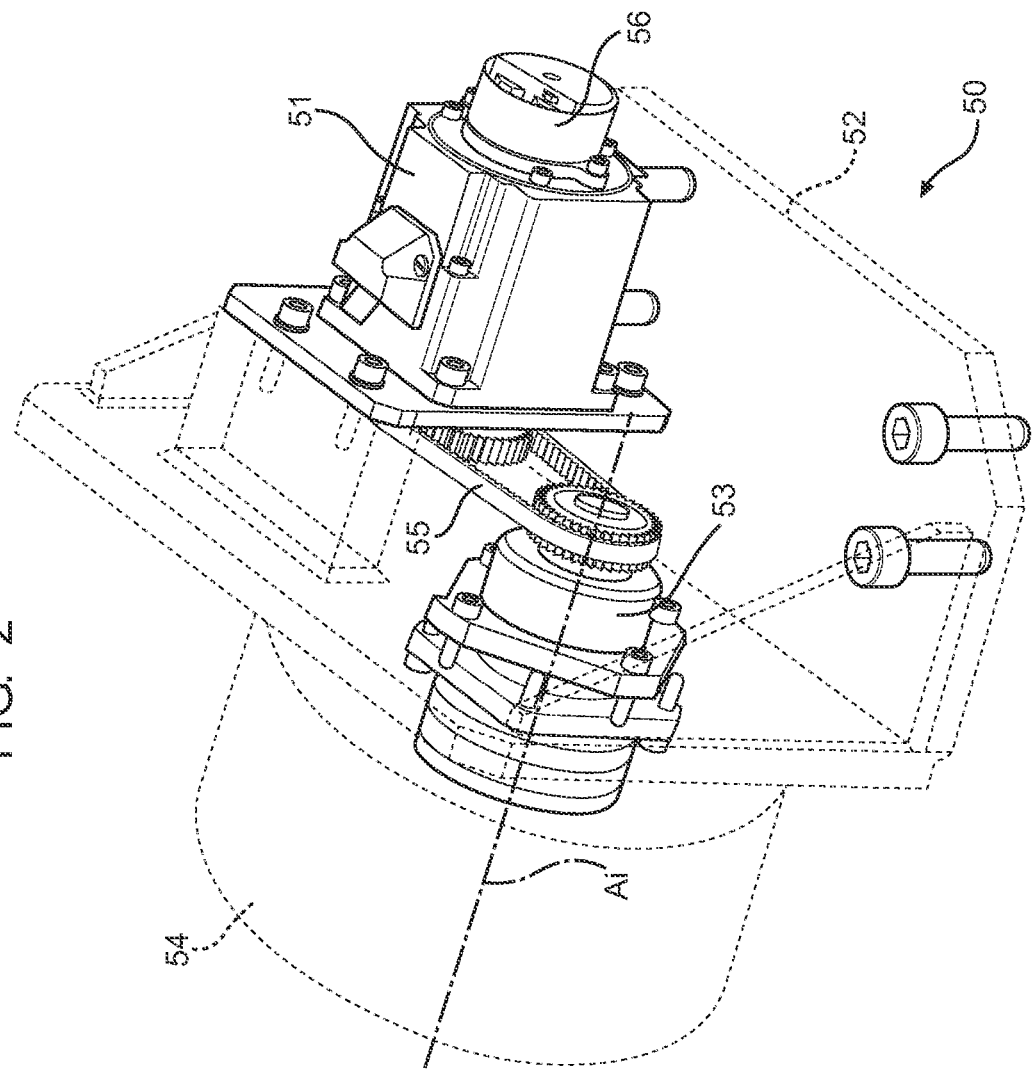
FIG. 2 illustrates an example of a joint of an industrial robot.

Once again by way of example, FIG. 2 represents the structure of a joint of an industrial robot, which could be adopted for each of the joints of the articulated arm 10 illustrated in FIG. 1.

The joint illustrated, designated as a whole by the reference number 50, comprises a first body 52 and a second body 54, the latter being mounted on the first body 52 rotatably about an axis of rotation Ai.

The joint 50 moreover comprises a motor 51, which is carried by the first body 52, and a transmission assembly designed to transmit the torque generated by the motor 51 to the second body 54, which comprises a speed reducer 53, positioned in the area of coupling of the two bodies 52 and 54, and a belt-transmission assembly 55, which connects the output shaft of the motor 51 to the input shaft of the reducer 53.

Provided on the motor 51 is an encoder 56 for measuring the angular position and the velocity of rotation of the output shaft of the motor itself.

The control unit 20 illustrated in FIG. 1 uses the signal of the encoder 56 to provide a closed-loop control for driving the joint.

The problems discussed at the start linked to the increase in backlash evidently regard the gears of the reducer 53 of the joint of FIG. 2.

The above problems have repercussions on the precision and efficiency of operation of the joint.

With reference to FIG. 1, each of the joints of the articulated arm 10 can suffer from negative effects due to the increase in backlash in the gears of its motion-transmission assembly, and moreover in a way essentially independent of the state of the other joints.

The solution described herein has precisely the purpose of monitoring the increase in backlash in a joint of an industrial robot and is characterized in that it uses the same encoder that is associated to the motor for driving the joint, without envisaging any additional sensor specifically dedicated to monitoring of the backlash.

Figure 3:
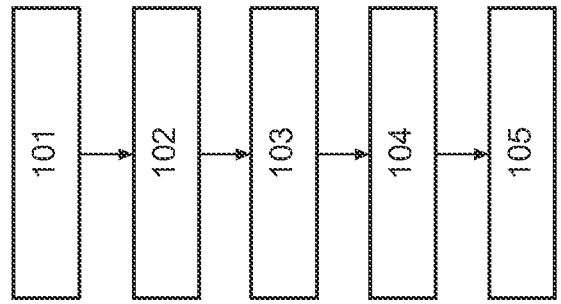
FIG. 3 illustrates a flowchart representing an example of a process for monitoring backlash according to the solution described herein.

With reference to FIG. 3, according to the solution described herein, the process for monitoring backlash in a gear of a joint of an industrial robot comprises the steps of:
- driving (101) via the motor of the joint a movement of the second joint body with respect to the first joint body;
- during said movement, acquiring (102) a signal of the encoder;
- receiving (103) a characteristic oscillation curve;
- processing (104) the signal of the encoder to identify an oscillation curve in said signal, corresponding to the aforesaid characteristic oscillation curve;
- determining (105) a parameter of the oscillation curve identified, indicating an amplitude of oscillation; and
- determining (106) a condition of backlash on the basis of the parameter determined.

The solution described herein stems from the observation that the presence of backlash causes mechanical vibrations that propagate along the entire kinematic chain of the joint, and that are also reflected in the signal generated by the encoder associated to the motor for driving the joint, in the form of an oscillation presenting a characteristic pattern.

This characteristic oscillation pattern or curve may be defined via one or more parameters that vary as the value of backlash increases according to a given correlation.

Consequently, by monitoring the signal of the encoder and, in particular the evolution of the aforesaid characteristic oscillation curve, it is possible to monitor the state of backlash of the gears of the joint.

The signal of the encoder may be proportional to the angular position of the output shaft of the motor or else proportional to its velocity of rotation.

Preferably, the process described herein uses a signal proportional to the velocity of rotation.

Consequently, in the case where the signal of the encoder is a signal proportional to the angular position of the motor, the process envisages carrying out an operation of differentiation of the signal of the encoder to obtain precisely a signal proportional to the velocity of rotation. In the ensuing treatment, also the signal obtained via the operation of differentiation is considered as a signal of the encoder.

Figure 4:
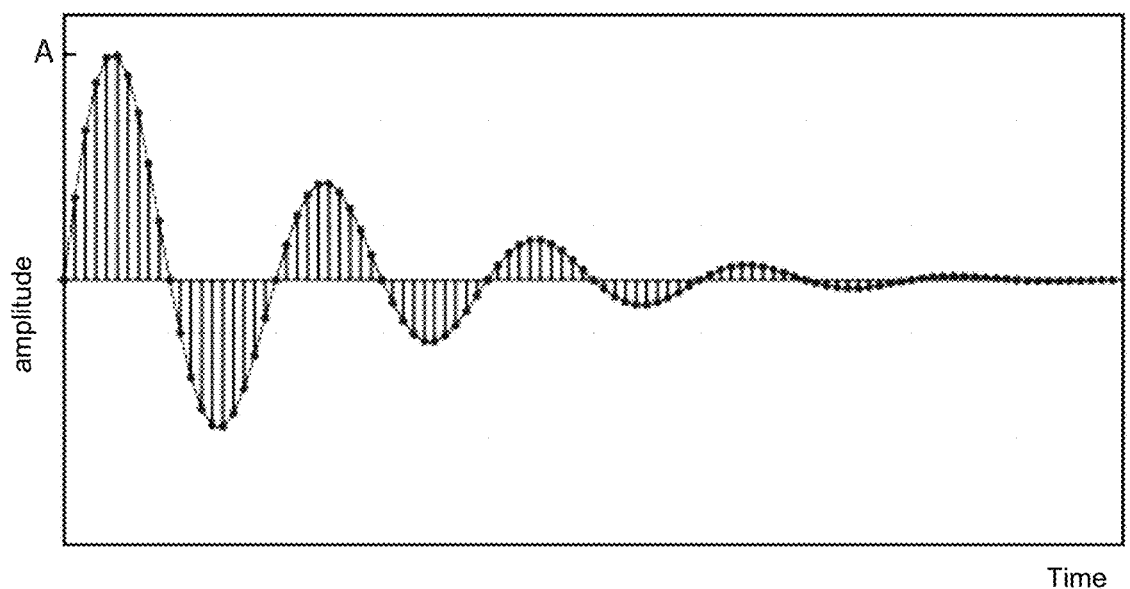
FIG. 4 illustrates a characteristic oscillation curve used by the process for monitoring backlash according to the solution described herein.

FIG. 4 illustrates an example of the characteristic oscillation curve discussed above. In general, this curve corresponds to a damped oscillation curve, which can be defined by the following formula:

$$d_b(t) = \begin{cases} 0 & t < t_1 \\ Ae^{-(t-t_1)\tau}\sin\omega(t) & t_1 \leq t \leq t_2 \\ 0 & t > t_2 \end{cases}$$

where:
- db is the oscillation induced by the backlash;
- A is the maximum amplitude of oscillation;
- t1 is the instant of start of oscillation;
- t2 is the instant of end of oscillation; and
- τ is an oscillation-damping factor.

This can be explained by the fact that the mechanical vibrations discussed above, caused by the backlash, are in actual fact caused by the impact that occurs between the teeth of the toothed wheels of the gear.

The mechanical vibrations generated by this impact have a damped vibration pattern and are hence reflected as damped oscillation in the signal of the encoder.

Figure 5:
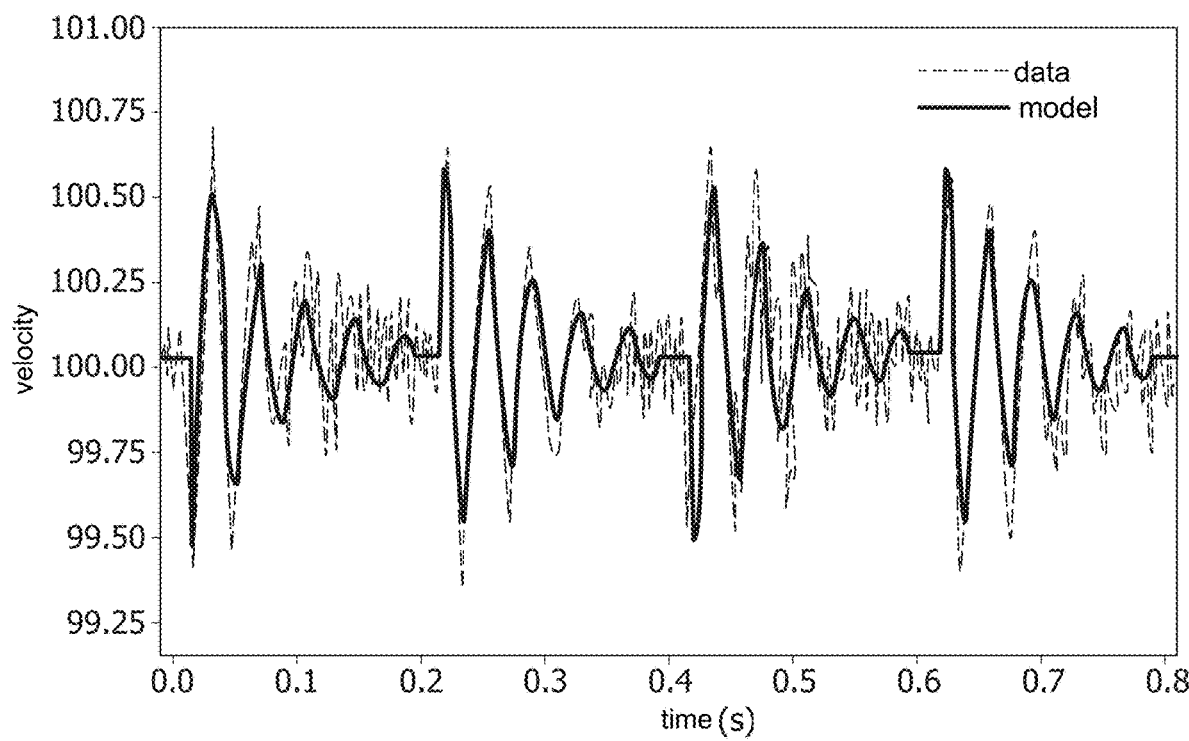
FIG. 5 represents a diagram illustrating signal processings performed in the monitoring process according to the solution described herein.

To identify the characteristic curve in the signal of the encoder it is possible to employ commonly used techniques of multivariate statistical analysis. For instance, the present applicant has identified the CMA-ES (Covariance Matrix Adaptation-Evolution Strategy) algorithm as a technique suited for the purpose. In this connection, FIG. 5 illustrates by way of example a diagram where superimposed on the signal of the encoder obtained during tests conducted on a joint of the type illustrated in FIG. 2 is the characteristic oscillation curve identified using the CMA-ES algorithm.

With reference to the formula given above, the parameter of the characteristic oscillation curve, which can be correlated with the backlash, is represented by the parameter A, corresponding to the maximum amplitude of the oscillation.

The correlation in question can be derived experimentally.

For instance, it is possible to set up a test bench that reproduces the structure of the robot joint, and subject the recreated joint to various work cycles for each of which, on the one hand, the oscillation of the encoder is analysed, as mentioned above, and on the other, the degree of the backlash on the gear is measured directly.

On the basis of the parameters A determined and of the direct measurements of the backlash, it is possible to identify a correlation between the two quantities, for example, through a regression analysis.

Purely by way of example, once again with reference to the tests mentioned above conducted for a joint of the type illustrated in FIG. 2, the present applicant has identified the following function:

$$\delta(A) = 10^{-4}(-0.000009\ A^3 + 0.003122\ A^2 + 0.138764\ A - 0.138809)$$

where δ is the value of the backlash and A is the same parameter as that of the formula given above.

In view of the foregoing, for implementation of the solution described herein, it is sufficient to provide means for storing and processing the signal of the encoder, and hence it is not necessary to intervene on the robot.

Among other things, since the control unit of the robot already normally uses the signal of the encoder for driving the motor of the joint, it may be sufficient to program the control unit of the robot so that it will store and possibly process the above signal.

Processing of the signal may in any case also be performed by a processing unit that is altogether independent of the control unit of the robot.

For instance, the above processing unit may belong to a remote processing centre.

In general, the control unit of the robot may be prearranged for transmitting the stored data to the processing unit through a communication network, for example the Internet.

According to a preferred embodiment, the solution described herein envisages a test mode for driving the joint during acquisition of the encoder signal.

The above mode envisages driving the motor to obtain a movement of rotation at constant speed. Moreover, according to an even more preferred embodiment, the aforesaid test mode envisages arranging the joint so that the axes of rotation of the gears to be tested are oriented horizontally. This means that the force of gravity can contribute to inducing impact between the teeth of the toothed wheels of the gear, thus giving rise to an encoder signal in which it is possible to identify the characteristic oscillation curve more precisely.

According to this preferred embodiment, the control unit of the robot may be configured for driving the motor of the joint to be tested, and possibly also the motors of the other joints of the robot, so as to obtain driving of the joint according to the test mode.

It is clear that in this case acquisition of the signal of the encoder may be obtained only during driving of the joint in the above test mode.

As has been seen above, each joint of the robot can suffer from adverse effects due to the increase in backlash in its gears, and hence each joint of the robot must be tested.

In preferred embodiments, the control unit of the robot may be configured for carrying out the test mode for the various joints of the robot in succession, so that it is possible to envisage a single machine downtime during which all the joints of the robot are tested.

On the other hand, the control unit may be configured so as to conduct testing of the joints of the robot in a programmed way, for example after a given number of work cycles.

In view of the foregoing, it emerges clearly that the solution described herein can be readily applied to industrial robots of any type, and also to robots that are already installed and operational, and makes it possible to obtain a monitoring of the backlash that is effective and reliable and that can be easily adapted to the different needs of the various contexts in which an industrial robot may operate.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A process for monitoring backlash in a gear of a joint of an industrial robot, wherein said joint comprises: a first joint body and a second joint body movably coupled together, a motor provided with an encoder, and a motion-transmission assembly operable to transmit a torque generated by said motor to said second joint body to bring about a movement of said second joint body with respect to said first joint body, said motion-transmission assembly comprising said gear,
said process comprising the steps of:
driving via said motor a movement of said second joint body with respect to said first joint body;
during said movement, acquiring a signal of said encoder;
receiving a characteristic oscillation curve;
processing said encoder signal for identifying an oscillation curve in said encoder signal, corresponding to said characteristic oscillation curve;
determining a parameter of the oscillation curve identified, indicating an amplitude of oscillation; and
determining a condition of backlash on the basis of said parameter determined.

2. The process according to claim 1, wherein said characteristic oscillation curve comprises a damped-oscillation curve.

3. The process according to claim 2, wherein said signal of said encoder comprises a signal proportional to a velocity of rotation of an output shaft of said motor.

4. The process according to claim 2, wherein the joint of the industrial robot comprises a plurality of individual joints, said step of driving said movement comprises driving said movement according to a test mode, and wherein said driving in test mode is performed for the plurality of individual joints in succession.

5. The process according to claim 1, wherein driving said movement of said second joint body further comprises driving said movement according to a test mode in which a velocity of said movement is constant.

6. The process according to claim 5, wherein said signal of said encoder comprises a signal proportional to a velocity of rotation of an output shaft of said motor.

7. The process according to claim 5, wherein the joint of the industrial robot comprises a plurality of individual joints, the determining the condition of backlash comprises driving in the test mode the plurality of individual joints in succession.

8. The process according to claim 5 wherein in the test mode toothed wheels of said gear are arranged with their own axes of rotation oriented horizontally.

9. The process according to claim 1, wherein said signal of said encoder comprises a signal proportional to a velocity of rotation of an output shaft of said motor.

10. The process according to claim 1, wherein the joint of the industrial robot comprises a plurality of individual joints, said step of driving said movement comprises driving said movement according to a test mode, and wherein said driving in test mode is performed for the plurality of individual joints in succession.

11. A system for monitoring backlash in a gear of a joint of an industrial robot, comprising:
the industrial robot comprising at least said joint, wherein said joint comprises a first joint body and a second joint body movably coupled together, a motor provided with an encoder, a motion-transmission assembly operable to transmit a torque generated by said motor to said second joint body to bring about a movement of said second joint body with respect to said first joint body, said transmission assembly comprising said gear,
a control unit for driving said motor according to a test mode in order to monitor the backlash of said gear; and
a processing unit configured for:
receiving, one of directly or through said control unit, a signal of said encoder regarding a step of driving of said motor in said test mode;
receiving a characteristic oscillation curve;
processing said encoder signal for identifying an oscillation curve in said encoder signal, corresponding to said characteristic oscillation curve;
determining a parameter of the oscillation curve identified, which indicates an amplitude of oscillation; and
determining a condition of backlash on the basis of said parameter determined.

12. The system according to claim 11, wherein said control unit is configured for storing the signal of said encoder regarding the step of driving said motor in said test mode.

13. The system according to claim 12 wherein said control unit is configured for transmitting data of said stored signal to said processing unit through a communication network.

14. A computer-program product that can be loaded into a memory of at least one processor and comprises portions of software code for implementing the steps of the process according to claim 1.

* * * * *